US011075567B2

(12) United States Patent
Hara et al.

(10) Patent No.: US 11,075,567 B2
(45) Date of Patent: Jul. 27, 2021

(54) RECIPROCATING TOOL

(71) Applicant: MAKITA CORPORATION, Anjo (JP)

(72) Inventors: Ryosuke Hara, Anjo (JP); Tomohiro Ukai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 106 days.

(21) Appl. No.: 16/658,265

(22) Filed: Oct. 21, 2019

(65) Prior Publication Data

US 2020/0052551 A1    Feb. 13, 2020

Related U.S. Application Data

(63) Continuation of application No. 16/011,166, filed on Jun. 18, 2018, now Pat. No. 10,511,208, which is a
(Continued)

(30) Foreign Application Priority Data

Apr. 1, 2015 (JP) .................................. 2015-075254
Apr. 1, 2015 (JP) .................................. 2015-075255

(51) Int. Cl.
*B23D 49/16* (2006.01)
*H02K 7/14* (2006.01)
(Continued)

(52) U.S. Cl.
CPC ............. *H02K 7/145* (2013.01); *B23D 49/16* (2013.01); *B26D 5/14* (2013.01); *F16H 21/18* (2013.01);
(Continued)

(58) Field of Classification Search
CPC ... H02K 7/145; H02K 9/06; B23D 49/16–167
See application file for complete search history.

(56) References Cited

U.S. PATENT DOCUMENTS 3,305,031 A    2/1967   Bez et al.
7,363,713 B2   4/2008   Hirabayashi et al.
(Continued)

FOREIGN PATENT DOCUMENTS

JP    2000-084730 A    3/2000
JP    2002-144255 A    5/2002
(Continued)

OTHER PUBLICATIONS

May 10, 2018 Notice of Allowance issued in U.S. Appl. No. 15/045,609.
(Continued)

*Primary Examiner* — Ramon M Barrera
(74) *Attorney, Agent, or Firm* — Oliff PLC

(57) ABSTRACT

A reciprocating tool includes a motor, a reciprocating member, and a crank mechanism. The motor is disposed in a housing. The reciprocating member projects from the housing. The crank mechanism converts rotation of a rotation shaft of the motor into reciprocation of the reciprocating member. The crank mechanism rotates around an axis in a lateral direction by rotation transmission from the rotation shaft, and the crank mechanism includes a crank member having an eccentric pin, a connecting rod coupling the eccentric pin to the reciprocating member, and a balancer coupled to the eccentric pin, and the balancer is supported by the eccentric pin alone in the housing.

8 Claims, 13 Drawing Sheets

Related U.S. Application Data continuation of application No. 15/045,609, filed on Feb. 17, 2016, now Pat. No. 10,027,201.

(51) Int. Cl.
| | |
|---|---|
| *H02K 7/075* | (2006.01) |
| *H02K 7/04* | (2006.01) |
| *B26D 5/14* | (2006.01) |
| *F16H 21/18* | (2006.01) |
| *H02K 9/06* | (2006.01) |

(52) U.S. Cl.
CPC ............... *H02K 7/04* (2013.01); *H02K 7/075* (2013.01); *H02K 9/06* (2013.01)

(56) References Cited

U.S. PATENT DOCUMENTS

| | | |
|---|---|---|
| 7,996,996 B2 | 8/2011 | Hirabayashi |
| 2008/0189961 A1 | 8/2008 | Oberheim |
| 2011/0180286 A1* | 7/2011 | Oomori ................. H02K 7/145 173/20 |

FOREIGN PATENT DOCUMENTS

| | | |
|---|---|---|
| JP | 2010-173039 A | 8/2010 |
| JP | 2014-024126 A | 2/2014 |
| JP | 2014-97570 A | 5/2014 |
| JP | 2014-133284 A | 7/2014 |
| WO | 2014/119211 A1 | 8/2014 |
| WO | 2014/182273 A1 | 11/2014 |

OTHER PUBLICATIONS

Aug. 7, 2018 Office Action issued in Japanese Patent Application No. 2015-075255.
Aug. 21, 2018 Office Action issued in Japanese Patent Application No. 2015-075254.
Apr. 5, 2019 Office Action issued in U.S. Appl. No. 16/011,166.
Apr. 9, 2019 Office Action issued in Japanese Patent Application No. 2015-075254.
Oct. 3, 2019 Office Action issued in Japanese Patent Application No. 2018-212490.

* cited by examiner

RECIPROCATING TOOL

This application is a continuation of U.S. application Ser. No. 16/011,166, filed Jun. 18, 2018, which in turn is a continuation of U.S. application Ser. No. 15/045,609, filed Feb. 17, 2016, which is based on and claims priority under 35 U.S.C. 119 from Japanese Patent Application Numbers 2015-075254 filed on Apr. 1, 2015 and 2015-075255 filed on Apr. 1, 2015. The contents of the above applications are incorporated herein by reference.

BACKGROUND

Technical Field

The present invention relates to a reciprocating tool such as a reciprocating saw configured to cause a reciprocating member such as a slider to be reciprocated by a crank mechanism.

Related Art

A reciprocating tool includes a crank mechanism constituted of a crank member such as a bevel gear to which rotation of a motor is transmitted, an eccentric pin disposed on an eccentric position of the crank member, and a connecting rod one end of which is coupled to the eccentric pin. The other end of the connecting rod is coupled to the reciprocating member to convert the rotation of the motor into reciprocation of the reciprocating member. For example, Japanese Patent Application Publication 2014-24126 A discloses a reciprocating saw with a slider as the reciprocating member mounting a cutting blade. Further, there has been known a technique in which a balancer is pressed-in and fixed on a distal end of the eccentric pin for reduction of vibration.

Furthermore, as disclosed in Japanese Patent Application Publication 2014-133284 A for example, a motor is housed in a cylindrical motor housing constituted by assembling a pair of half housings.

In such reciprocating tool, the crank member is occasionally disposed in vertical with an axis in the lateral direction with respect to the reciprocating member disposed in the front-rear direction. In this vertical crank mechanism, the pin pressed-in and fixed on the rotational center of the balancer is held by a bearing disposed on the inner surface of the housing. However, when the reciprocating member is temporarily locked by an excessive load in use, the impact generates a deviation in the positional relationship between the crank member and the balancer. As a result, a deviation is also generated between the center of the bearing supporting the crank member and the center of the bearing supporting the pin of the balancer. Then, abnormal noise and abnormal vibration are generated between the crank mechanism and the housing. On the other hand, employing a compact brushless motor as the motor ensures the reduced size (diameter) of the motor housing. Accordingly, in a case of a model such as a reciprocating saw that generates the vibration, the motor housing with a half-split structure may cause rigidity shortage.

Therefore, it is an object of the present invention to provide a reciprocating tool that can reduce the generation of abnormal noise and abnormal vibration regardless of the impact in locking a reciprocating member.

It is also an object of the present invention to provide a reciprocating tool that can ensure the rigidity of a motor housing even if a brushless motor is employed.

SUMMARY

In order to achieve the above-described object, a reciprocating tool according to a first aspect of the present invention includes a motor, a reciprocating member, and a crank mechanism. The motor is disposed in a housing. The reciprocating member projects from the housing. The crank mechanism converts rotation of a rotation shaft of the motor into reciprocation of the reciprocating member. The crank mechanism rotates around an axis in the lateral direction by rotation transmission from the rotation shaft. The crank mechanism includes a crank member, a connecting rod, and a balancer. The crank mechanism has an eccentric pin. The connecting rod couples the eccentric pin to the reciprocating member. The balancer is coupled to the eccentric pin. The balancer is supported by the eccentric pin alone in the housing.

A reciprocating tool according to a second aspect of the present invention, which is in the first aspect of the present invention, the balancer is supported by pressing-in of the eccentric pin.

A reciprocating tool according to an eighth aspect of the present invention, which is in the first aspect of the present invention, the motor is a brushless motor where the rotation shaft extends in the front-rear direction. The reciprocating tool further includes a tip end tool holder driven by the brushless motor, a motor housing of an integrally molded cylinder type for housing the brushless motor, a handle housing of a loop type coupled to the motor housing, and a control unit that is disposed on the lower portion of the handle housing and controls the brushless motor.

A reciprocating tool according to a ninth aspect of the present invention, which is in the first aspect of the present invention, the motor is a brushless motor where the rotation shaft extends in the front-rear direction. The reciprocating tool further includes a tip end tool holder driven by the brushless motor, a motor housing of an integrally molded cylinder type for housing the brushless motor, a handle housing coupled to the motor housing, a battery mounting portion that is disposed on the lower portion of the handle housing and mounts a battery, and a control unit that is disposed on the battery mounting portion and controls the brushless motor.

A reciprocating tool according to a tenth aspect of the present invention, which is in the first aspect of the present invention, the motor is a brushless motor where the rotation shaft extends in the front-rear direction. The reciprocating tool further includes a tip end tool holder driven by the brushless motor, a first motor housing of an integrally molded cylinder type for housing the brushless motor, a second motor housing that covers the first motor housing, and a handle housing integrally formed with the second motor housing.

A reciprocating tool according to an eleventh aspect of the present invention, which is in the first aspect of the present invention, the motor is a brushless motor where the rotation shaft extends in the front-rear direction. The reciprocating tool further includes a tip end tool holder driven by the brushless motor, a motor housing of an integrally molded cylinder type for housing the brushless motor, a handle housing coupled to the motor housing, a control unit that is disposed on the lower portion of the handle housing and controls the brushless motor, an exhaust outlet disposed on the motor housing, and an air intake opening disposed on the handle housing.

With the reciprocating tool according to the embodiment disclosed in the first aspect of the present invention, the generation of the abnormal noise and the abnormal vibration is reduced by supporting the balancer by the eccentric pin alone in the housing, regardless of the impact in locking the reciprocating member.

With the reciprocating tool according to the embodiment disclosed in the second aspect of the present invention, in addition to the effect of the first aspect of the present invention, pressing-in of the eccentric pin ensures the balancer to be mounted easily.

With the reciprocating tool according to the embodiment disclosed in the eighth to eleventh aspect of the present invention, in addition to the effect of the first aspect of the present invention, employing the motor housing of the integrally molded cylinder type ensures the rigidity even if the brushless motor is employed.

DETAILED DESCRIPTION

The following describes embodiments of the present invention based on the drawings.

Figure 1:
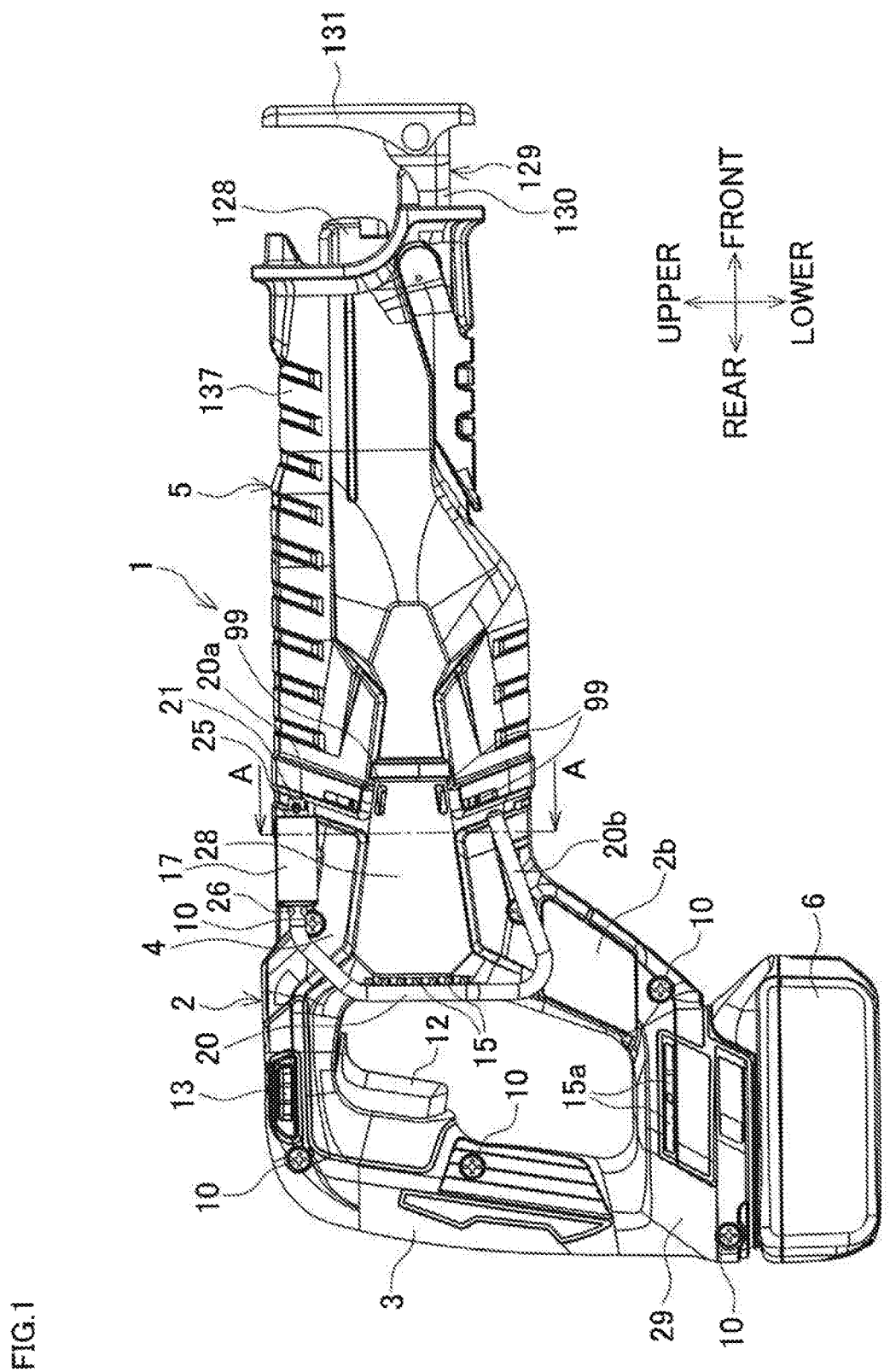
FIG. 1 is a side view of a rechargeable reciprocating saw.
Figure 2:
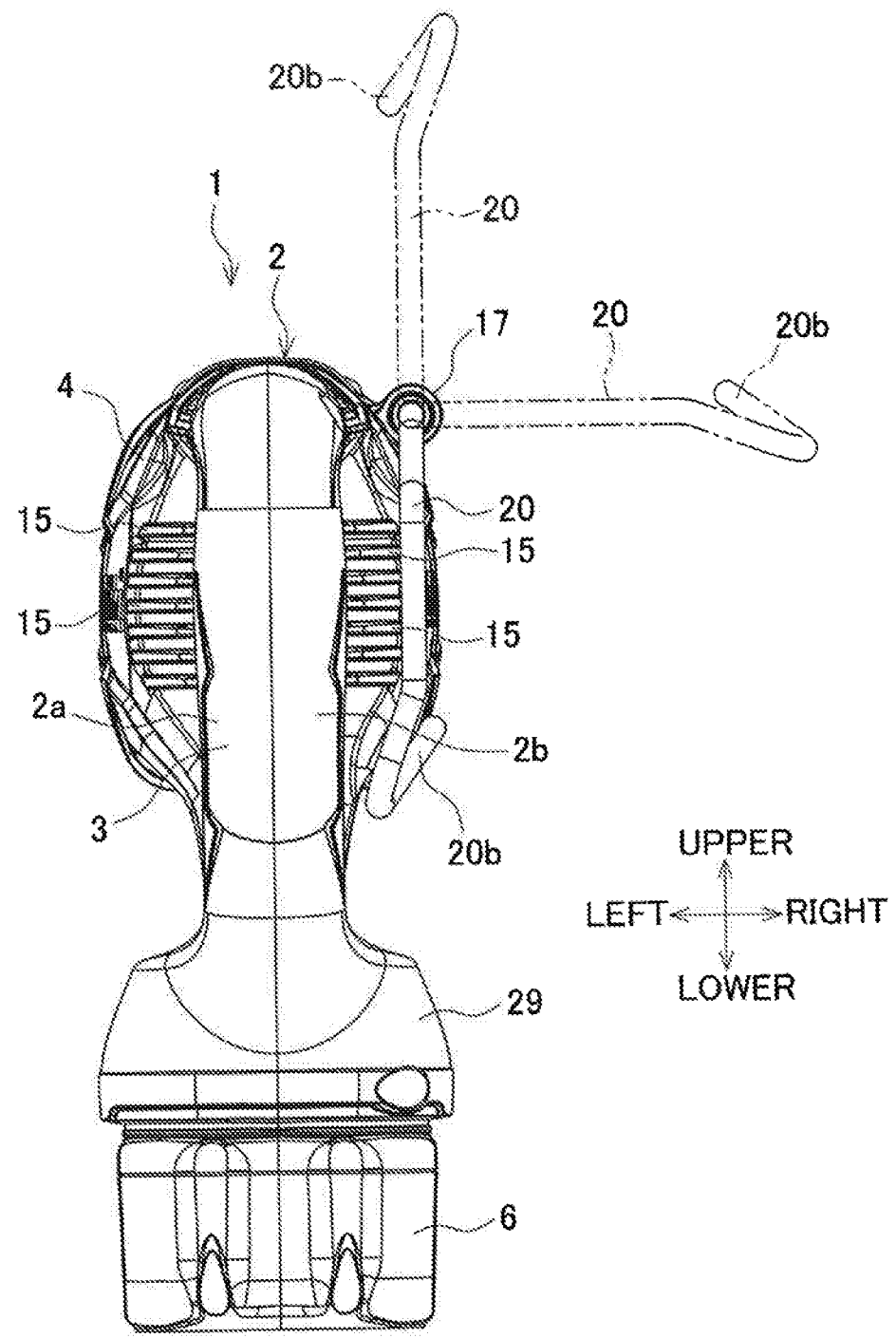
FIG. 2 is a back view of the rechargeable reciprocating saw.
Figure 3:
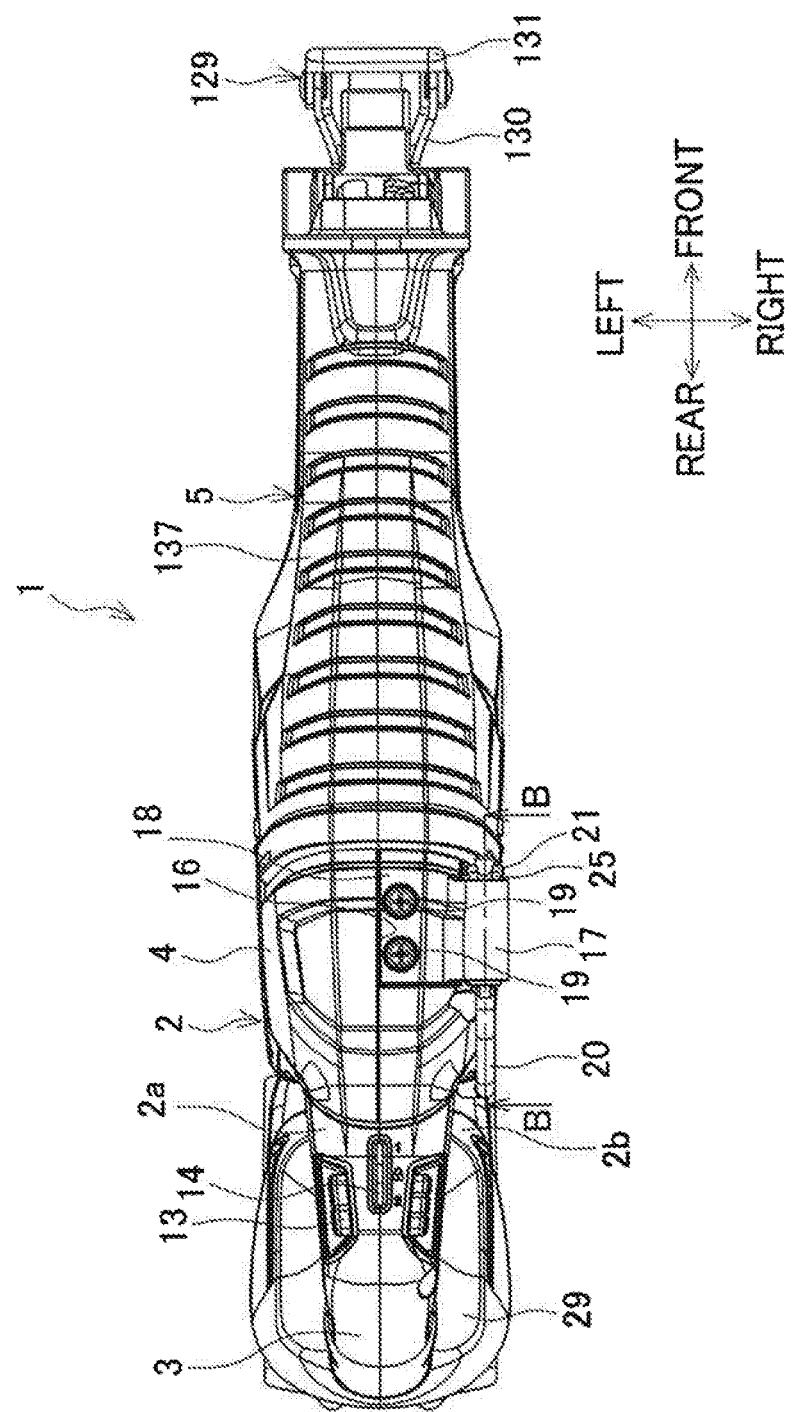
FIG. 3 is a plan view the rechargeable reciprocating saw.
Figure 4:
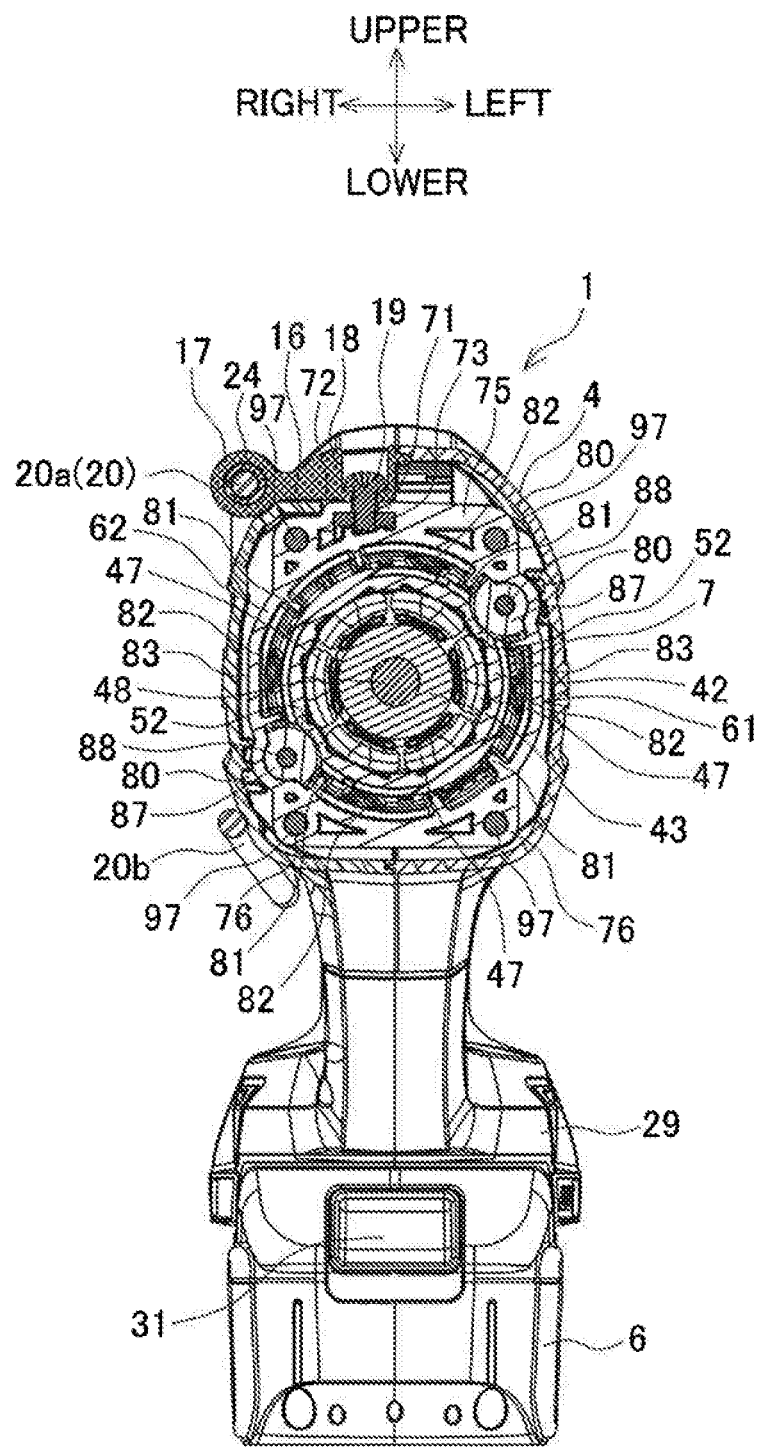
FIG. 4 is a cross-sectional view taken along the line A-A of FIG. 1.
Figure 6:
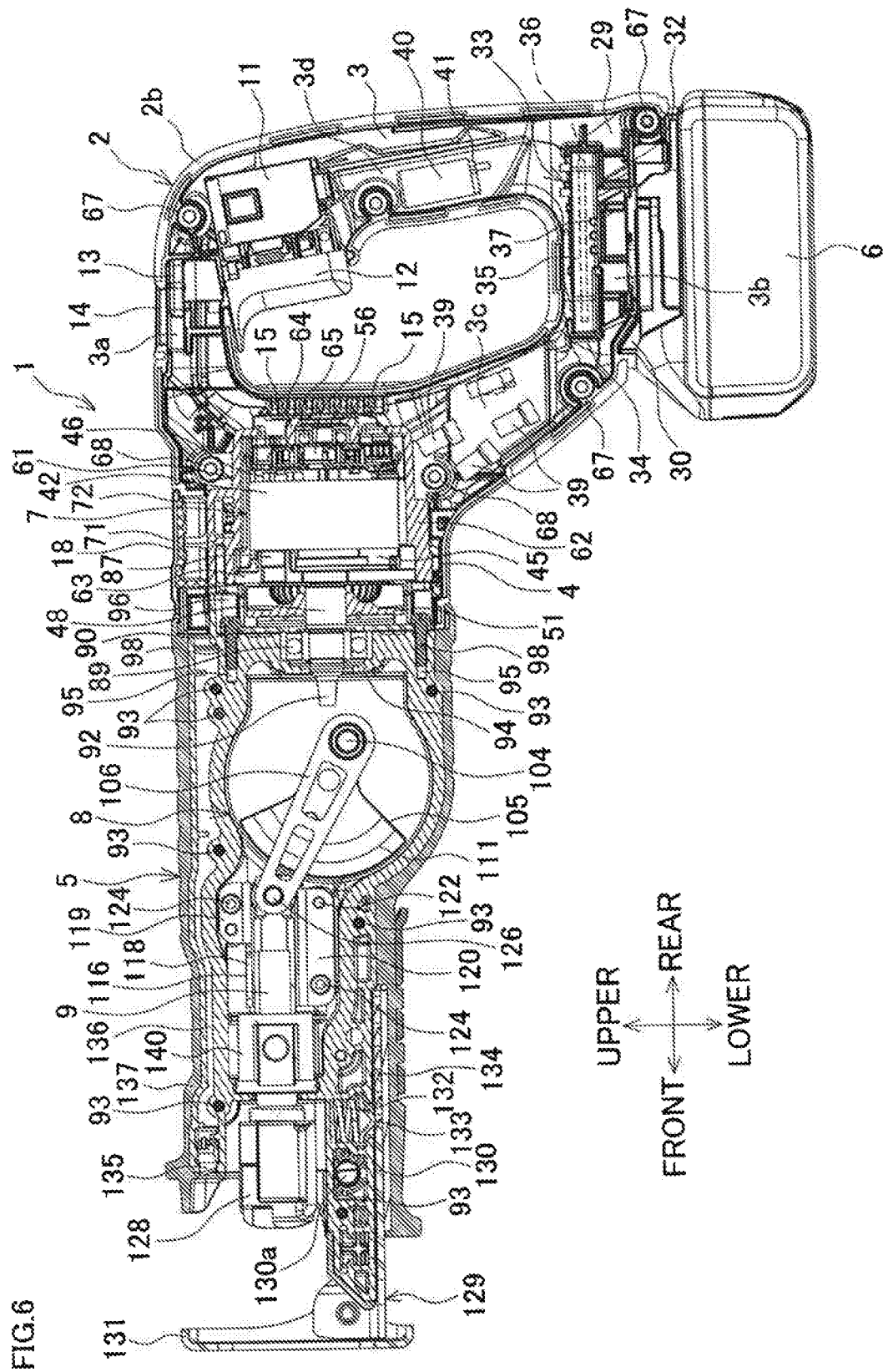
FIG. 6 is a vertical cross-sectional view of the rechargeable reciprocating saw.

FIG. 1 is a side view of a rechargeable reciprocating saw (hereinafter simply referred to as "reciprocating saw") 1 as an exemplary reciprocating tool. FIG. 2 is a back view, and FIG. 3 is a plan view of the reciprocating saw 1. A housing of the reciprocating saw 1 includes a rear housing 2 that has a handle housing 3 and an outer motor housing 4 as a second motor housing in the rear and front respectively, and a front housing 5 assembled ahead of the rear housing 2. The handle housing 3 mounts a battery pack 6 as a power source on the lower end of the handle housing 3. The outer motor housing 4 houses a brushless motor 7 (described later) inside as illustrated in FIG. 4 and FIG. 6. The front housing 5 houses a vertical crank mechanism 8 inside to convert rotation of the brushless motor 7 into reciprocation of a slider 9 as a reciprocating member extending in the front-rear direction.

The rear housing 2 is made of resin and assembled with a pair of half housings 2a and 2b, which are integrally formed of the handle housing 3 and the outer motor housing 4, by screws 10 in the lateral direction. The outer motor housing 4 is formed in a cylindrical shape that has a lateral cross-sectional surface in an approximately oval shape. The handle housing 3 is formed of a handle upper portion 3a, a handle lower portion 3b, a handle front portion 3c, and a handle rear portion 3d in a loop shape projecting backward from the outer motor housing 4. The handle rear portion 3d as a grip houses a switch 11 with a trigger 12 projecting forward. A trigger signal line is coupled to a controller 33 (described later) wired in the handle rear portion 3d from the switch 11. The handle upper portion 3a includes a lock off button 13 capable of performing a sliding operation in the lateral direction, and includes a window 14 for displaying the position of the lock off button 13 on the top surface of the handle upper portion 3a. The handle front portion 3c, which closes the rear of the outer motor housing 4, includes a plurality of slit-shaped first air intake openings 15 on the right and left sides in up and down direction. The handle lower portion 3b also includes second air intake openings 15a on the right and left sides.

Figure 5:
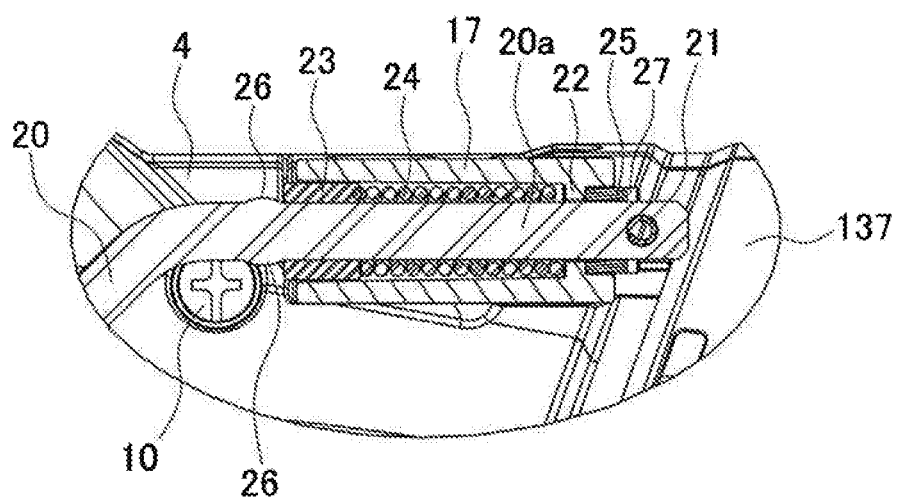
FIG. 5 is a partial cross-sectional view taken along the line B-B of FIG. 3.

The outer motor housing 4 includes a depressed portion 16 on the upper right side. This depressed portion 16 supports a cylindrical hook receiver 17 in the front-rear direction by fixing an extension plate 18 disposed to extend on the left side to an inner motor housing 61 (described later) by two screws 19 of front and rear as illustrated in FIG. 4. This hook receiver 17 mounts a suspension hook 20 formed of a metallic rod-shaped body folded in U-shaped. Specifically, a one end portion 20a of the suspension hook 20 is inserted into the hook receiver 17 from the rear, and a retaining pin 21 is passed through to the distal end projecting from the hook receiver 17 orthogonally. This ensures the suspension hook 20 to be mounted to retain. As illustrated in FIG. 5, the hook receiver 17 externally mounts a coil spring 24 on the one end portion 20a inside the hook receiver 17 between a protrusion 22 disposed on the inner peripheral front side of the hook receiver 17 and a stopper 23 externally mounted on the one end portion 20a in the rear of the protrusion 22. In the normal state, the suspension hook 20 is biased on the retreated position where the retaining pin 21 is in contact with a locking ring 25 inserted into the front end of the hook receiver 17. A projection 26 is disposed to protrude on an outer periphery of the one end portion 20a and receives a rear end of the coil spring 24.

The locking ring 25 includes a cross-shaped groove 27 on the front face thereof, and the retaining pin 21 is locked on the groove 27 in the lateral direction and the vertical direction. As illustrated in FIG. 2 by solid lines and two-dot chain lines, this ensures the suspension hook 20 to be positioned on three positions where the retaining pin 21 is locked on the groove 27 (a housing position where an other end portion 20b of the suspension hook 20 comes to the lower side, a horizontally projecting position where the other end portion 20b projects to the right side, an upward projecting position where the other end portion 20b projects upward) by 90°. When the position is changed, the suspension hook 20 is extruded forward from the retreated position and the locking of the retaining pin 21 with the locking ring 25 is released. Then, the suspension hook 20 can be operated to rotate to any positions.

Accordingly, the reciprocating saw 1 can be suspended by locking the other end portion 20b to a locking tool disposed on such as a wall or similar tool in a state where the suspension hook 20 is in the position of the horizontally projecting position or the upward projecting position. As illustrated in FIG. 1, the other end portion 20b is bent at an acute angle such that the other end portion 20b approaches the one end portion 20a side as it goes forward. Therefore, the other end portion 20b is hardly removed in a state where the other end portion 20b is locked to the locking tool or similar tool. A part near the other end portion 20b of the suspension hook 20 is configured to be bent inward along the side face of the outer motor housing 4 at the housing position illustrated by the solid line in FIG. 2, so that the part does not project outside. As illustrated in FIG. 3, the whole suspension hook 20 is within the maximum width of the reciprocating saw 1 at the housing position without projecting. Furthermore, the suspension hook 20 at the housing position surrounds the outside of a display area 28 for such as a company name logo, which is disposed on the side face of the outer motor housing 4, not to cover the display area 28.

The battery pack 6 is slid from forward to be mounted on a battery mounting portion 29 disposed on the lower end of the handle housing 3. A retaining hook 30 is disposed on the battery pack 6 to lock the battery pack 6 on the battery mounting portion 29. A release button 31 releases a lock state of the retaining hook 30.

Figure 7:
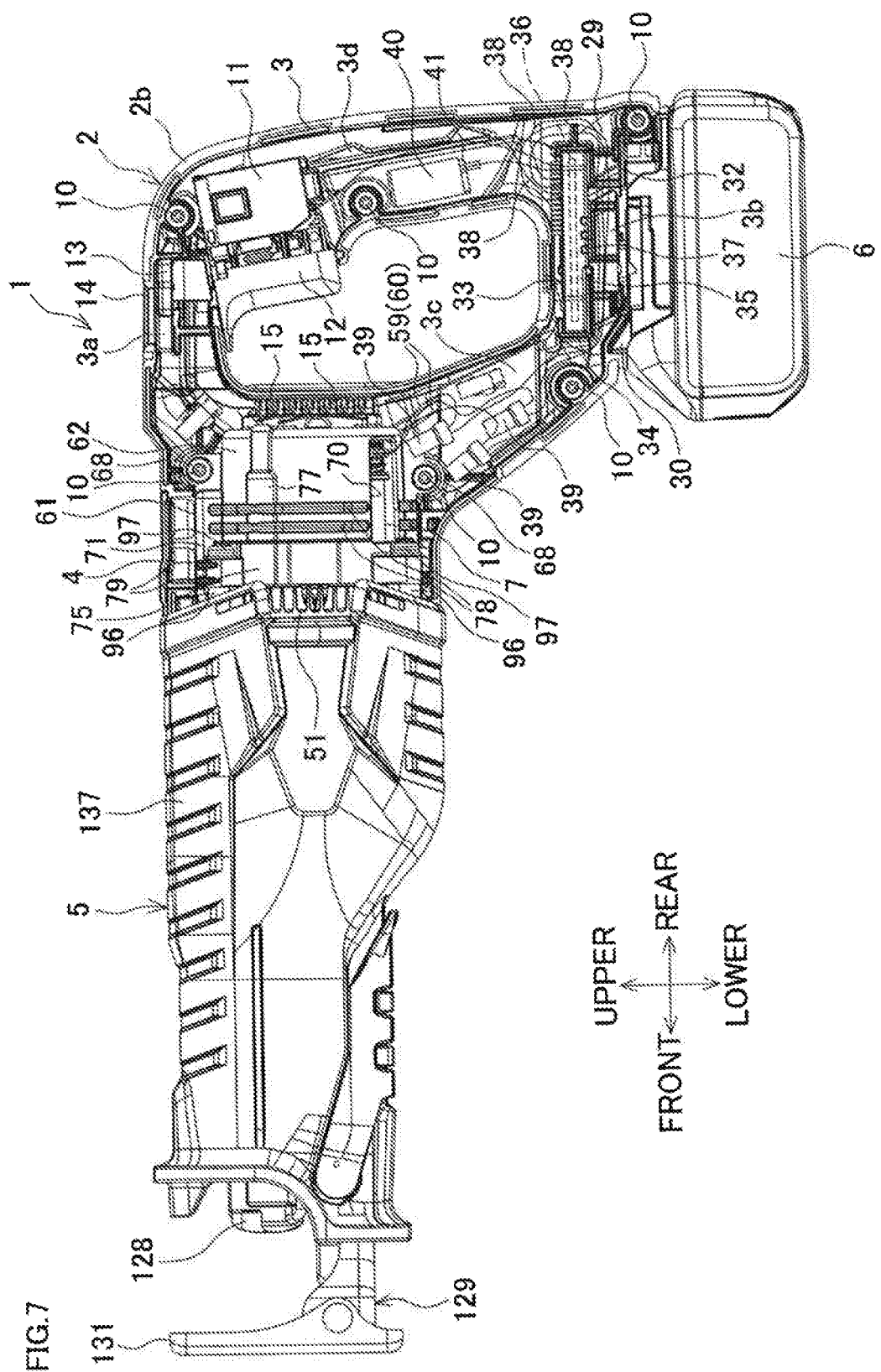
FIG. 7 is a side view of the rechargeable reciprocating saw in a state where a left side half housing of a rear housing is omitted.
Figure 8:
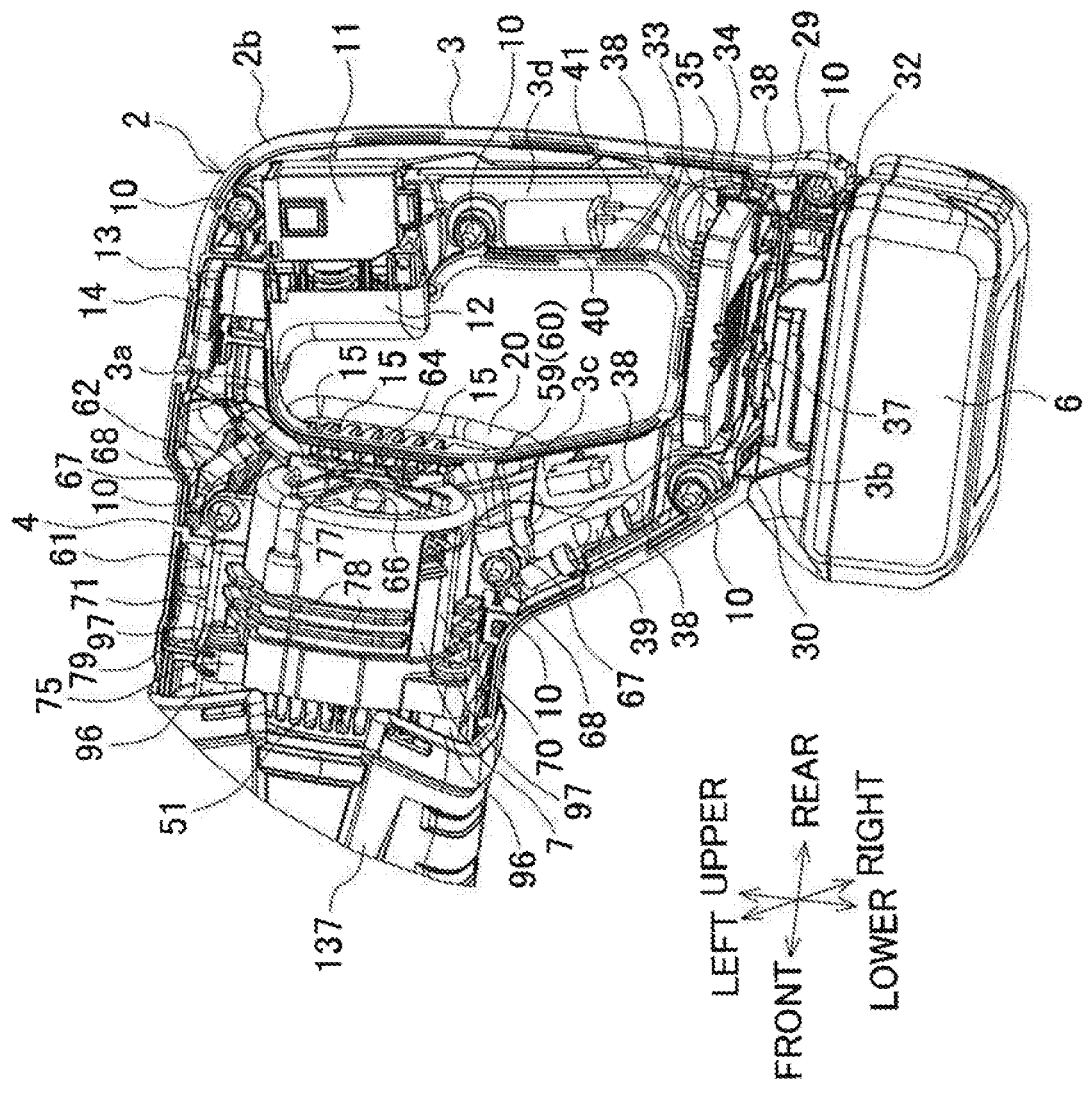
FIG. 8 is a perspective view of the rear housing part of FIG. 7.

As illustrated in FIG. 6 to FIG. 8, the battery mounting portion 29 holds a terminal block 32 that is electrically coupled to the mounted battery pack 6 in the front-rear direction inside the battery mounting portion 29. The battery mounting portion 29 holds the controller 33 as a control unit above the terminal block 32 inside the battery mounting portion 29. The controller 33 is held by a rib 34, which is disposed to protrude on the inner surface of the handle housing 3, with some space between the terminal block 32 and the controller 33, and parallel to the terminal block 32.

This controller 33 houses a switching element for controlling the brushless motor 7 and a control circuit board 36 mounting a microcomputer and similar device on a metallic dish-shaped case 35. The case 35 includes a grid-like groove 37 on the inferior surface to increase an area contacted with air. From the rear top surface of the control circuit board 36, lead wires 38 are extracted (in FIG. 7 and FIG. 8, illustrated by a simple one line) to wrap around the controller 33 from the rear to downward. Then, the lead wires 38 pass through a space between the terminal block 32 and the controller 33 to be pulled out forward, and are coupled to lead wires 59 and 60 (described below) pulled out from the brushless motor 7. Protective caps 39 are fitted on a coupling portion of the lead wire 38, and the lead wires 59 and 60. A dust-proof and water proof specification is realized by coating the coupling portion of the lead wires one another including the protective cap 39 by resin, so that an international standard IP56 is supported. A capacitor 40 is not mounted on the control circuit board 36 but supported by a support rib 41 above the controller 33 in the handle housing 3 without obstructing the wiring of the lead wire 38. The capacitor 40 may be disposed on the handle front portion 3c. Thus, space in the handle is effectively utilized by disposing the control circuit board on the lower portion of the loop-shaped handle and disposing the capacitor on any of the handle rear portion or the handle front portion to disperse electronic material components. This prevents the handle from upsizing.

Figure 9:
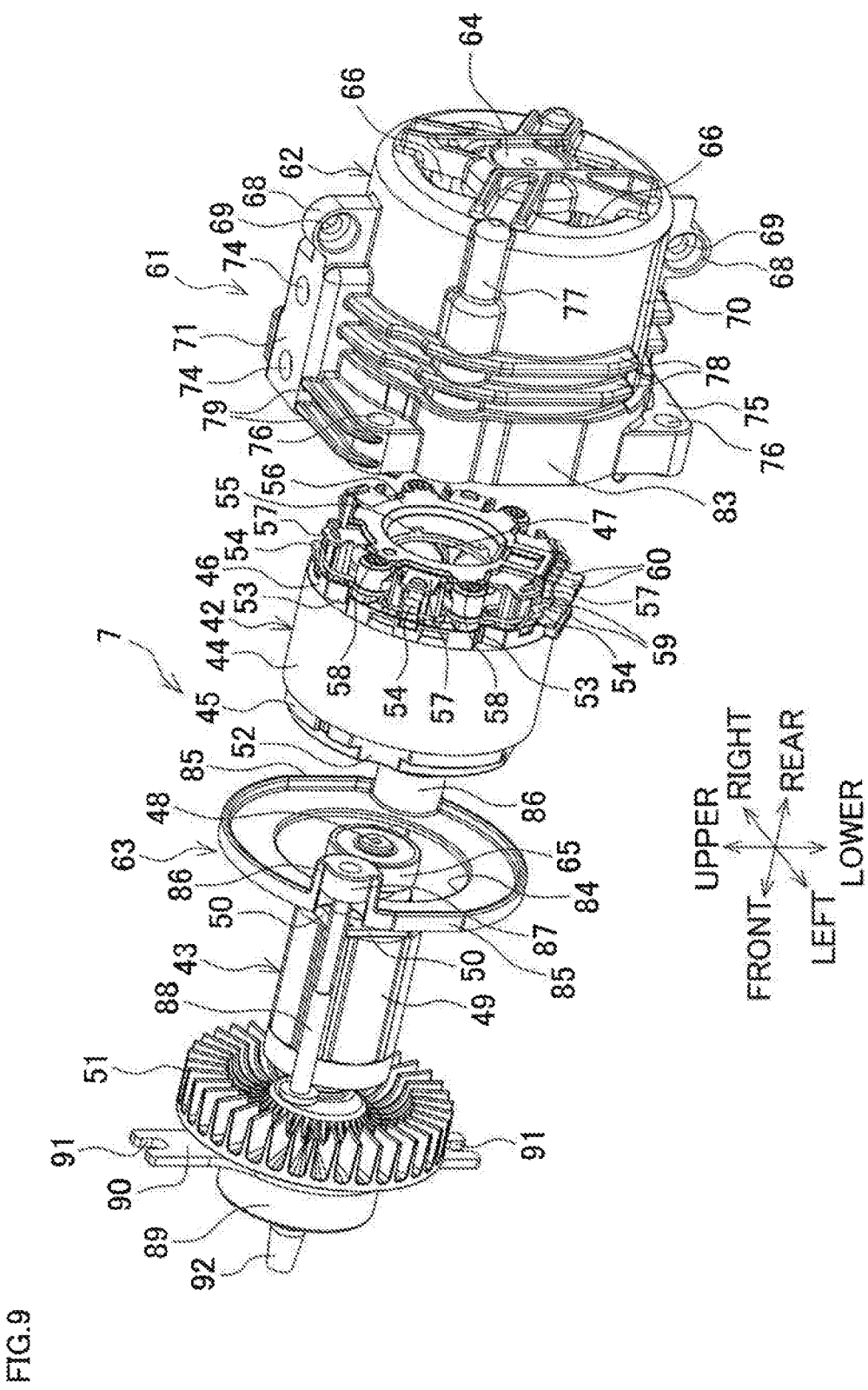
FIG. 9 is an exploded perspective view of a brushless motor and an inner motor housing.

As illustrated in FIG. 4, FIG. 6, and FIG. 9, the brushless motor 7 is an inner rotor type motor including a stator 42 and a rotor 43 disposed inside the stator 42. First, the stator 42 has a cylindrical stator core 44 formed of a plurality of laminating steel plates, a front insulator 45 and a rear insulator 46 disposed on the end surfaces of the front and rear in the axial direction of the stator core 44 respectively, and six coils 47 wound around the stator core 44 via the front insulator 45 and the rear insulator 46.

The rotor 43 includes a rotation shaft 48 disposed on the sham center, an approximately cylindrically-shaped rotor core 49 disposed on the peripheral area of the rotation shaft 48 and formed of a plurality of laminating steel plates, and four permanent magnets 50 inserted and fastened into the rotor core 49. On the rotation shaft 48, a centrifugal fan 51 is fastened ahead of the rotor core 49.

The front insulator 45 includes depressed relief portions 52 on the point symmetry position of the circumferential surface, and the rear insulator 46 includes four cutouts 53 on the circumferential surface at regular intervals in the circumferential direction. Furthermore, the rear insulator 46 holds six fusing terminals 54 on the rear face that are performed fusing by a winding wire between the coil 47 and the coil 47. On the rear face of the rear insulator 46, a sensor circuit board 55 mounting three rotation detecting elements (not illustrated) for detecting the position of the permanent magnet 50 to output a rotation detecting signal, and a short-circuit member 56 including three sheet metal members 57 for short-circuiting the fusing terminals 54 diagonally one another are mounted by screws 58 from backward. The lead wire 59 is coupled to the sensor circuit board 55 to output the rotation detecting signal, and the lead wire 60 is coupled to each sheet metal member 57 for a power source. The lead wires 59 and 60 are pulled out from the identical phase (here, the lower left side) of the stator 42.

The brushless motor 7 is housed in the inner motor housing 61 as a second motor housing that is secured to inside the outer motor housing 4. The inner motor housing 61 includes a main body cylinder 62 with an opening on the front that houses the whole stator 42 and a part of the rotor 43 (the rear part including the rotor core 49), and a closing plate 63 closing the opening of the main body cylinder 62. The inner motor housing 61 has a planar surface shape in the front-rear direction, and the type is an integrally molded cylinder type not divided laterally or vertically.

The main body cylinder 62 includes a bearing holder 64 on the center of the rear portion to hold a bearing 65 pivotally supporting the rear end of the rotation shaft 48. The main body cylinder 62 opens suction openings 66 on the peripheral area of the bearing holder 64. The main body cylinder 62 includes anchor pieces 68 disposed to protrude on the upper and lower position of the outer periphery. Each of the anchor pieces 68 fits in right and left screw bosses 67 for assembling the half housings 2a and 2b, and has a through hole 69. In assembling the half housings 2a and 2b, the anchor pieces 68 are sandwiched by the right and left screw bosses 67. This causes the main body cylinder 62 to be fastened. The main body cylinder 62 includes an outlet 70 for the lead wires 59 and 60 drilled on the left side of the lower anchor piece 68 on the inferior surface of the main body cylinder 62.

The main body cylinder 62 includes a pedestal 71 disposed to protrude on the top surface that is consecutively installed on the upper anchor piece 68 toward the front to make the top surface flat. This pedestal 71 exposes to nil opening 72 disposed on the bottom of the depressed portion 16 of the rear housing 2 in a state where the pedestal 71 is assembled to the rear housing 2. On the pedestal 71, the extension plate 18 of the hook receiver 17 is screwed. In the pedestal 71, a metal plate 73 (FIG. 4) to which the screws 19 are screwed is inserted and held. A through hole 74 is disposed on the pedestal 71 at a screw position.

Furthermore, the main body cylinder 62 includes a flange portion 75 in the front portion projecting out with a vertically elongated rectangular shape in front view. The flange portion 75 includes penetration holes 76 on the four corners.

The main body cylinder 62 includes a pair of screw receiving portions 77 opening toward the front in a phase different from the upper and lower anchor pieces 68 on the outer periphery of the main body cylinder 62.

Additionally, the main body cylinder 62 includes peripheral ribs 78 disposed upright on the circumferential surface along the circumferential direction by a predetermined distance in back and forth. The flange portion 75 also includes upper ribs 79 disposed upright on the top surface at the identical height with the pedestal 71 by a predetermined distance in back and forth. These peripheral rib 78 and upper rib 79 lock to inner ribs 80 disposed to protrude on the inner surface of the outer motor housing 4, as illustrated in FIG. 4. This restricts the move in the front-rear direction.

Then, the main body cylinder 62 internally includes a plurality of protrusions 81 that are disposed in the axial direction to bring in contact with the outer periphery of the stator 42. The protrusions 81 are disposed to protrude with a predetermined interval in the circumferential direction. The main body cylinder 62 includes four triangular locking projections 82 on the bottom face inside the main body cylinder 62. The locking projections 82 correspond to the four cutouts 53 disposed on the circumferential surface of the rear insulator 46. The main body cylinder 62 includes chamfering portions 83 on the right and left, side faces in the front portion.

The closing plate 63 is ring-shaped having a center hole 84 through which the rotor core 49 of the rotor 43 passes. The closing plate 63 includes chamfering portions 85 on the right and left outer surfaces corresponding to the chamfering portions 83 of the main body cylinder 62. The closing plate 63 includes a pair of cylindrical portions 86 on the outer periphery disposed toward the rear at the position corresponding to the screw receiving portions 77 of the main body cylinder 62. Each cylindrical portion 86 integrally includes a presser boss 87 with a penetration hole internally on the rear end. The presser boss 87 is used for screwing the closing plate 63. The presser boss 87 is in contact with the front face of the stator core 44 at the position of the depressed relief portion 52 of the front insulator 45 to press the stator 42 on the rear inner surface of the main body cylinder 62.

Then, in a state where the lead wires 59 and 60 are precedingly passed through the outlet 70, the stator 42 is inserted into the main body cylinder 62 from the front in the phase where the depressed relief portions 52 are adjusted to the screw receiving portions 77. This ensures the stator 42 to be held coaxially by the protrusions 81 in the main body cylinder 62. Each locking projection 82 locked on each cutout 53 is brought in contact with the rear face of the stator core 44 to decide the push-in position. Simultaneously, locking of each locking projection 82 on each cutout 53 ensures to stop the rotation.

Next, the closing plate 63 is fitted to the opening of the main body cylinder 62 with adjusting the position of the chamfering portions 85 of the closing plate 63 to the chamfering portions 83 of the main body cylinder 62 side. Then, the presser bosses 87 are in contact with the front face of the stator core 44 at the position of the depressed relief portions 52. Then, a pair of screws 88 is inserted into the presser bosses 87 from the front to screw to the screw receiving portions 77 of the main body cylinder 62. This ensures the stator 42 to be housed in the inner motor housing 61.

Then, the rotor 43 mounting the bearing 65 on the rear end of the rotation shaft 48 is inserted into the inner motor housing 61 from the center hole 84 of the closing plate 63 to cause the bearing holder 64 to hold the bearing 65. This ensures the rotor 43 to be housed in the inner motor housing 61 except a part ahead of the centrifugal fan 51. Ahead of the centrifugal fan 51 on the rotation shaft 48, a bearing 89 is mounted, and between the bearing 89 and the centrifugal fan 51, a stopper plate 90 through which the rotation shaft 48 passes is disposed including cuts 91, 91 on the upper and lower ends. The rotation shaft 48 includes a pinion 92 on the distal end.

Figure 10:
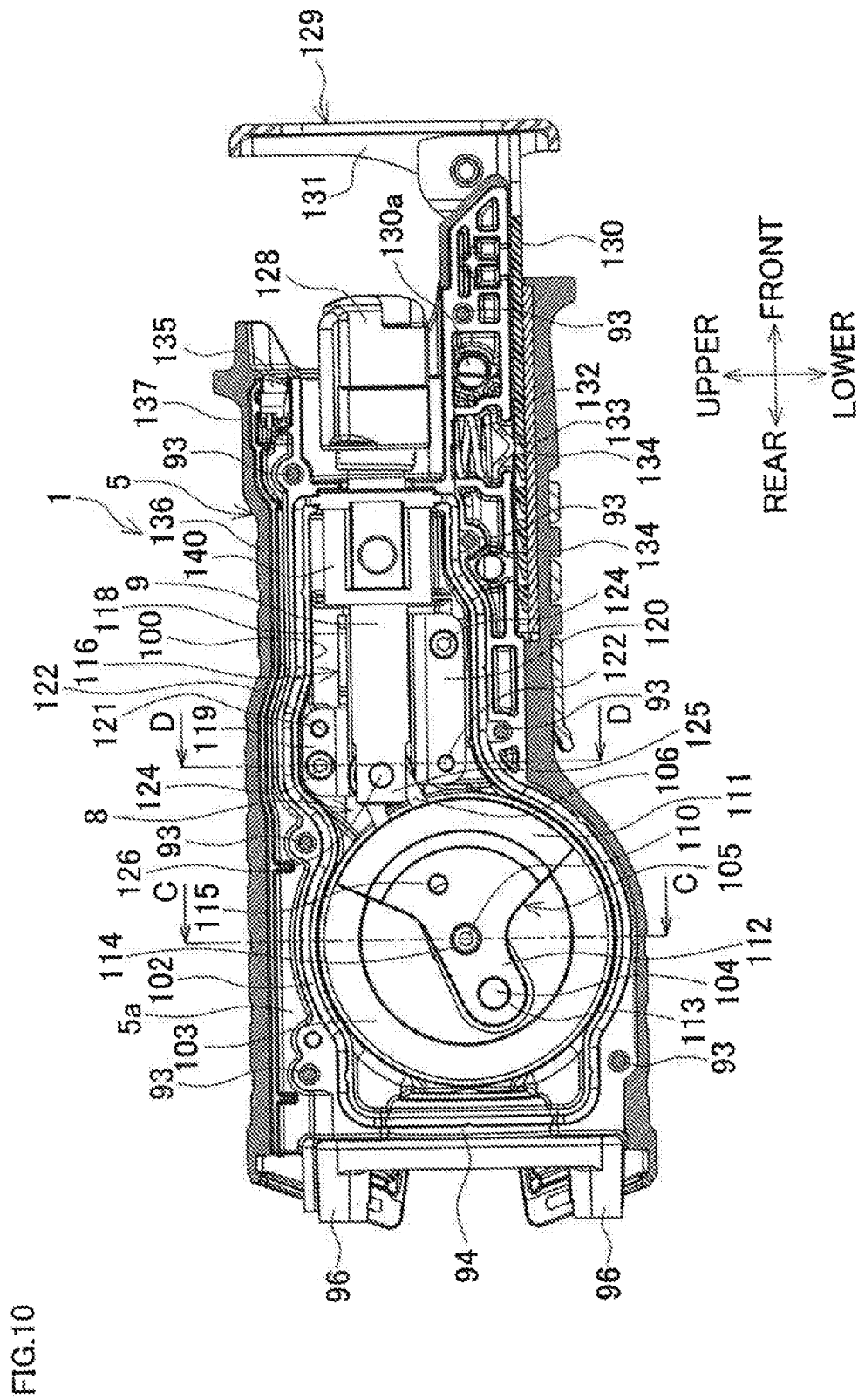
FIG. 10 is a vertical cross-sectional view of a front housing part.
Figure 11:
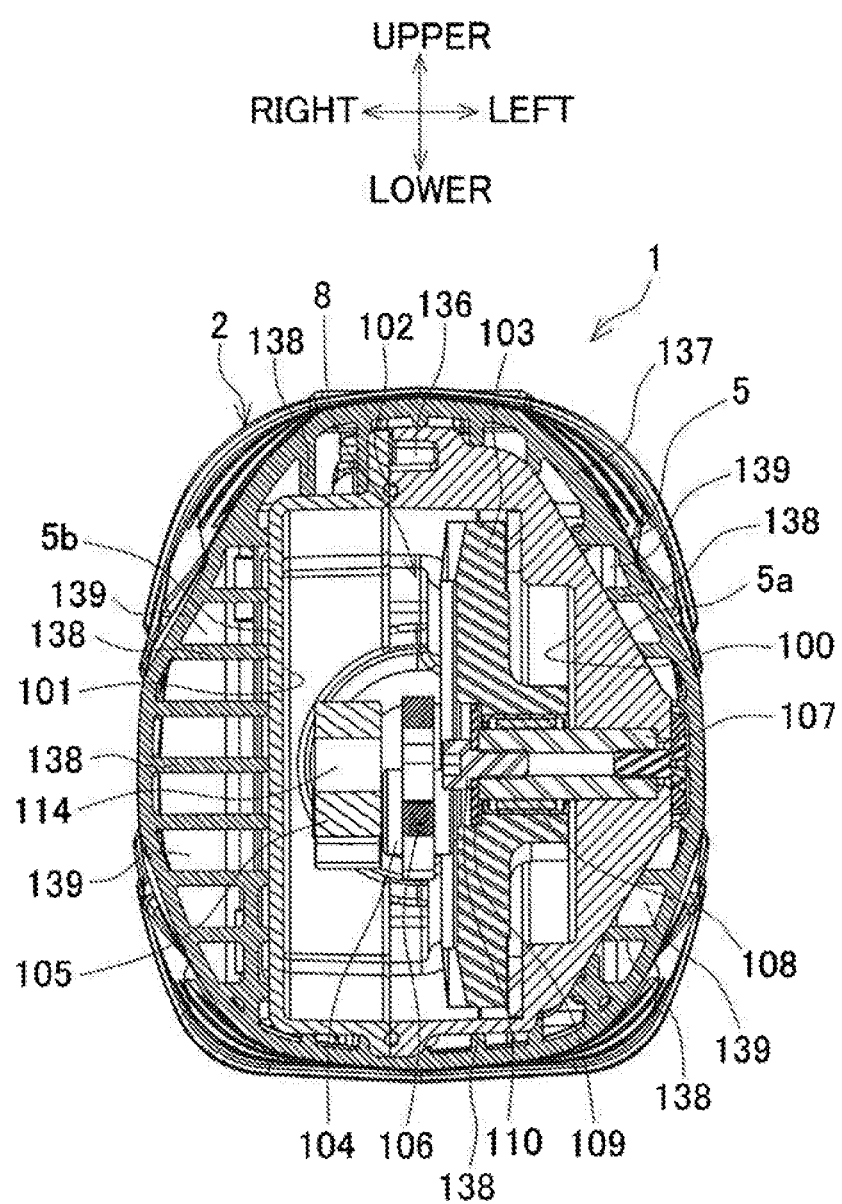
FIG. 11 is a cross-sectional view taken along the line C-C of FIG. 10.
Figure 12:
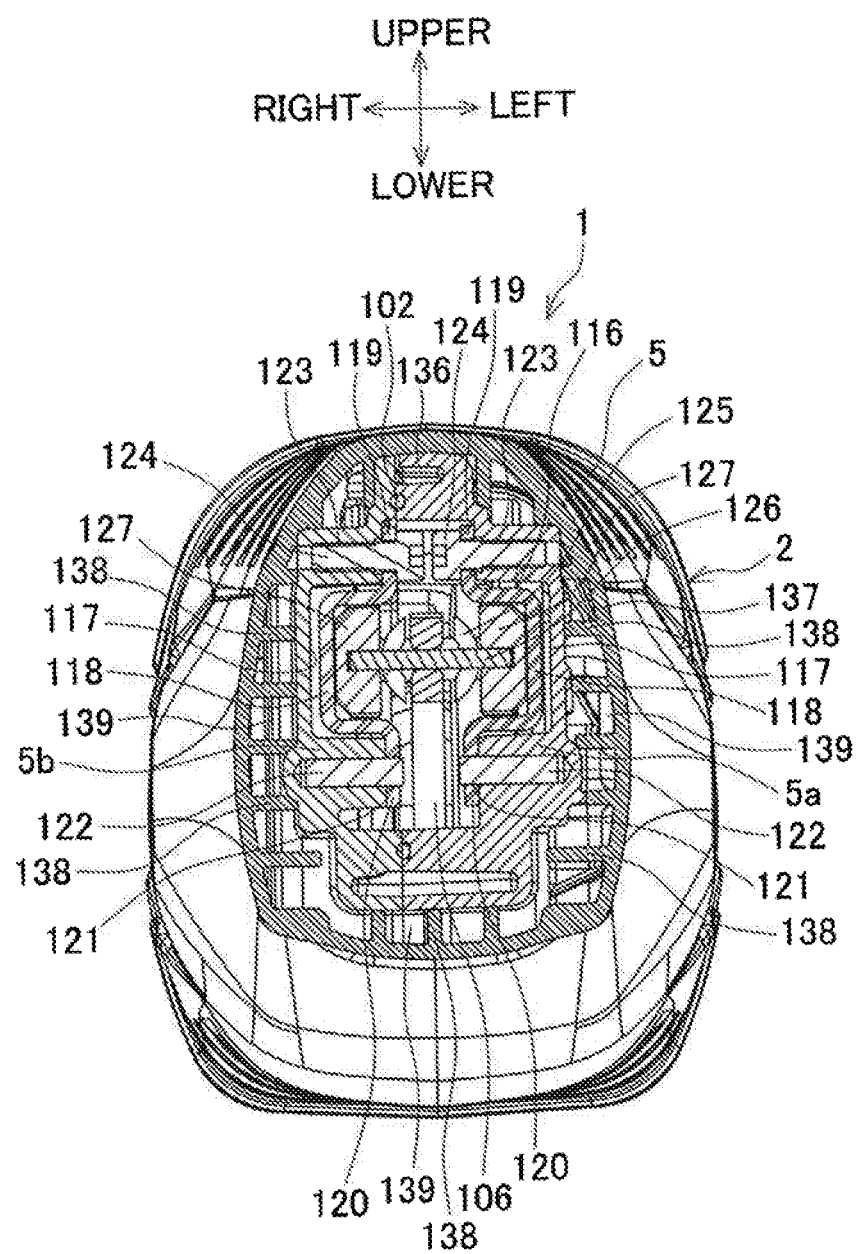
FIG. 12 is a cross-sectional view taken along the line D-D of FIG. 10.

As illustrated in FIG. 10 to FIG. 12, the front housing 5 is made of metal assembling a left split mold 5a and a right split mold 5b by screws 93 in the lateral direction. The left split mold 5a includes a small cylindrical holder 94 for holding the bearing 89 of the rotation shaft 48. The front housing 5 includes screw holes 95 (FIG. 6) upper and lower on the rear face corresponding to the cuts 91 of the stopper plate 90. The front housing 5 includes four screw bosses 96 on the rear face disposed to protrude corresponding to the four penetration holes 76 of the flange portion 75 disposed on the main body cylinder 62. Then, in a state where the distal end of the rotation shaft 48 passes through the holder 94 and the bearing 89 fits the holder 94, the flange portion 75 of the inner motor housing 61 is placed on the rear face of the front housing 5, and four screws 97 (FIG. 4, FIG. 7, and FIG. 8) are screwed into the screw bosses 96 from the rear via the penetration holes 76. Then, when screws 98 are screwed into the screw holes 95 via the cuts 91 of the stopper plate 90, the inner motor housing 61 is coupled to the rear end of the front housing 5 to cause the pinion 92 of the rotation shaft 48 to project inside the front housing 5. In this state, the bearing 89 is prevented from coming off from the holder 94 by the stopper plate 90.

Then, the inner motor housing 61 is set on the left side half housing 2a and the anchor pieces 68 are placed on the screw bosses 67. At the same time, the controller 33, the switch 11, and similar units are assembled, the lead wire 38 is coupled to the lead wires 59 and 60 one another, and similar operations are performed to complete the wiring. In this state, the left side half housing 2a is covered with and screwed to the right side half housing 2b with the screws 10, so that the rear housing 2 is coupled to the front housing 5 via the inner motor housing 61. Exhaust outlets 99 (FIG. 1) opens outside the centrifugal fan 51 on the right and left sides of the forward end portion of the outer motor housing 4.

On the other hand, the left split mold 5a and the right split mold 5b of the front housing 5 includes depressed housing portions 100 and 101 respectively for housing the vertical crank mechanism. 8 and the slider 9. The left split mold 5a and the right split mold 5b sandwich a sealing member 102 on the assembling surface except the part where the slider 9 passes through. The left split mold 5a has a large left and right width compared with the right split mold 5b, and the depressed housing portion 100 has a large depth compared with the depressed housing portion 101. This causes the assembling surface of the left split mold 5a and the right split mold 5b to be shifted to the right side of the center in the lateral direction.

The vertical crank mechanism 8 includes a bevel gear 103 as a crank member to which the pinion 92 of the rotation shaft 48 engages, an eccentric pin 104 disposed to protrude on the eccentric position of the bevel gear 103, a balancer 105 secured to the distal end of the eccentric pin 104, and a band plate-shaped connecting rod 106 coupled to between the eccentric pin 104 and the rear end of the slider 9. Here, the bevel gear 103 is disposed vertically such that a support shaft 107 in the lateral direction, which is screwed orthogonally in the depressed housing portion 100 of the left split mold 5a to project inward, supports the bevel gear 103 rotatably via a bearing (needle bearing) 108. A washer 109 retains the bevel gear 103, and a bolt 110 secures the washer 109 to the distal end of the support shaft 107.

The balancer 105 includes a weight portion 111 in fan-shape in side view, and a projecting portion 112 projecting from the center of the weight portion. The projecting portion 112 has a press-in hole 113 on the distal end. By pressing-in the distal end of the eccentric pin 104 to the press-in hole 113, the balancer 105 is rotatable integrally with the eccentric pin 104. A through hole 114 is drilled on the boundary part of the weight portion 111 and the projecting portion 112, on the extended line of the bolt 110. The through hole 114 ensure a tool to be inserted for rotating operation of the bolt 110 even if the balancer 105 is fixed. A positioning hole 115 is disposed on the weight portion 111 used for the positioning in fixing the balancer 105. The rear end of the connecting rod 106 is coupled to the eccentric pin 104 between the bevel gear 103 and the balancer 105, and on the approximately center position in the lateral direction. Thus, the balancer 105 is supported by the eccentric pin 104 alone, and has a structure without the support by the right split mold 5b.

Then, the slider 9 is held slidably in the front-rear direction ahead of the bevel gear 103 and on the upper position of the rotational center of the bevel gear 103 by a holder 116, which is held by the left and right split molds 5a and 5b. This holder 116 includes a pair of U-shaped brackets 118 secured in a depressed groove 117 that is disposed in the front-rear direction on the inner surface of the left split mold 5a and the right split mold 5b. Each of the brackets 118 is secured to the depressed grooves 117 of the left and right split mold 5a and 5b. On the upper and lower sides of each bracket 118, an upper flange 119 that is short in the back and forth direction and a lower flange 120 that is long in the back and forth direction are bent to be formed. Each of the upper and lower flanges 119 and 120 include a pair of through holes 121 in the back and forth direction.

On each inner surface of the left and right split molds 5a and 5b, a pin 122 is driven on the position corresponding to the through hole 121 disposed on the upper side of the depressed groove 117 and the front side of the upper flange 119, and a screw hole 123 is disposed on the position corresponding to the rear side through hole 121. On the other hand, on the position corresponding to the through hole 121 disposed on the lower side of the depressed groove 117 and the front side of the lower flange 120, the screw hole 123 is disposed, and on the position corresponding to the rear side through hole 121, the pin 122 is driven. Accordingly, by inserting the pin 122 into one through hole 121 of the upper and lower flanges 119 and 120, and screwing a bolt 124 into the screw hole 123 from the other through hole 121, each bracket 118 is fastened in the depressed groove 117.

The front end of the connecting rod 106 is coupled to the slider 9 in the following manner. In a state where the front end of the connecting rod 106 is placed between legs of a bifurcated portion 125 disposed on the rear end of the slider 9, a coupling pin 126 is passed through across the bifurcated portion 125 and the connecting rod 106 in the lateral direction. On both ends of the coupling pin 126, deflectors 127, 127 that fit to the brackets 118, 118 engage. In accordance with the sliding of the deflectors 127, 127 on both ends along the bracket. 118, the slider 9 is held by a slider guide 140, the front portion of which is disposed in the front housing 5, so that the slider is guided to slide in the front-rear direction. The slider 9 includes a blade holder 128 as a tip end tool holder that mounts a blade (not illustrated) on the front end projecting from the front housing 5.

On the other hand, the front housing 5 includes a guide shoe 129 below the slider 9 inside the front housing 5. This guide shoe 129 includes a slide bar 130 mounted slidable in the front-rear direction, and a shoe 131 secured on the front end of the slide bar 130 perpendicular to the slide bar 130 and through which the blade mounted on the blade holder 128 passes. In the front housing 5, a coil spring 132 downwardly biases a locking plate 133, and any of a plurality of locking depressed portions 134 disposed on the top surface of the slide bar 130 is selected to lock the locking plate 133. This ensures the front and rear positions of the shoe 131 to be adjusted. The positioned slide bar 130 is locked by the operation of a locking shaft 130a disposed ahead of the locking plate 133.

A LED 135 is disposed on the front face upper portion of the front housing 5 for lighting, and electrically coupled to the controller 33 in the rear housing 2 side by a lead wire (not illustrated) wired in a long groove 136 disposed on the left split mold 5a above the depressed housing portion 100 in the front-rear direction. On the outer periphery of the front housing 5, a cylindrical rubber cover 137 is externally mounted from the front. The rubber cover 137 is disposed to extend to the position where the rear end of the rubber cover 137 covers the front end of the outer motor housing 4 of the rear housing 2, and covers a part of the exhaust outlets 99, 99 except the central portion of the left and right side surfaces. However, the rubber cover 137 includes abutting ribs 138 disposed upright on the inner surface to abut on the outer surface of the front housing 5 in the front-rear direction. The abutting ribs 138 form ventilation passages 139 inside the rubber cover 137 such that the air discharged from the exhaust outlet 99 passes between the rubber cover 137 and the front housing 5 to discharge forward.

According to the reciprocating saw 1 configured as described above, pushing the trigger 12 to turn the switch 11 to ON causes the brushless motor 7 to drive by the power supply of the battery pack 6. That is, the microcomputer of the control circuit board 36 acquires the rotation detecting signal that is output from the rotation detecting element of the sensor circuit board 55 and indicates the position of the permanent magnet 50 of the rotor 43 to obtain the rotating state of the rotor 43. Then, the microcomputer controls ON/OFF of each switching element corresponding to the obtained rotating state, and supplies the current to each coil 47 of the stator 42 in order. This causes the rotor 43 to rotate.

Subsequently, the rotation shaft 48 rotates to cause the bevel gear 103 to rotate, and the eccentric pin 104 moves eccentrically. This causes the slider 9 to reciprocate via the connecting rod 106, and ensures the cutting of the cut material by the mounted blade. At this time, in accordance with the reciprocation of the slider 9, the balancer 105 reversely rotates in the back and forth direction with respect to the rotational center of the bevel gear 103. This reduces the generation of the vibration.

Here, if an excessive load applied to the blade during the cutting operation temporarily locks the slider 9, the impact generates a deviation in the positional relationship of the bevel gear 103 and the balancer 105. However, the balancer 105 is cantilevered by the eccentric pin 104 alone of the left split mold 5a without the support by the right split mold 5b. This reduces the deviation between the bevel gear 103 and the balancer 105. Accordingly, the influence to the front housing 5 is reduced, and the abnormal noise and the abnormal vibration are less likely to be generated.

On the other hand, the rotation of the centrifugal fan 51 with the rotation shaft 48 causes the outside air to be suctioned from the first air intake opening 15 and the second air intake opening 15*a* of the handle housing 3. Then, the suctioned outside air flows into the main body cylinder 62 from the suction opening 66 of the inner motor housing 61. Then, after the air flown into the main body cylinder 62 passes through between the coil 47 and the coil 47 inside the stator 42, and between the stator 42 and the inner surface of the main body cylinder 62 outside the stator 42, the air is introduced to the center hole 84 of the closing plate 63, and radially sent from the centrifugal fan 51 to be discharged from the exhaust outlet 99. Thus, the closing plate 63 functions as a baffle plate. This airflow cools the brushless motor 7. The air flown into from the second air intake opening 15*a* passes the controller 33 to flow to the brushless motor 7. This ensures to cool the controller 33. A part of the air discharged from the exhaust outlet 99 is discharged forward passing through the ventilation passage 139 in the rubber cover 137 as described above. This ensures to cool the front housing 5.

Thus, according to the reciprocating saw 1 of the above-described configuration, by supporting the balancer 105 by the eccentric pin 104 alone in the front housing 5, the generation of the abnormal noise and the abnormal vibration is reduced regardless of the impact in locking the slider 9.

In the present invention, especially, the balancer 105 is supported by pressing-in of the eccentric pin 104. This makes the mounting of the balancer 105 easy.

According to the reciprocating saw 1 of the above-described configuration, the configuration including the inner motor housing 61 of the integrally molded cylinder type for housing the brushless motor 7, the outer motor housing 4 for covering the inner motor housing 61, and the handle housing 3 integrally formed with the outer motor housing 4 ensures the rigidity even if the brushless motor 7 is employed. Furthermore, the outer motor housing 4 coupled to the inner motor housing 61 provides the wide display space (display area 28) for such as the company name logo.

Especially, since the outlet 70 for the wiring is disposed on the main body cylinder 62, the wiring to the controller 33 is easy even if the inner motor housing 61 of the integrally molded cylinder type is employed.

Mounting the balancer is not limited to pressing-in. The balancer may be mounted by the combination of the rotation stopper by such as a key coupling and a retaining by a pin. The shape of the balancer itself may be changed as necessary. The crank member includes a member integrally coupling a bevel gear to a crankshaft having an eccentric pin except a member having a bevel gear on which an eccentric pin is directly disposed.

The holder of the slider can be formed by combining a pair of L-shaped brackets other than forming by combining a pair of U-shaped brackets as described above.

However, other than supporting the balancer by the eccentric pin alone, the eccentric pin configured to be loosely inserted with respect to the balancer can reduce the impact even if the configuration where the pin pressed-in and fixed on the rotational center of the balancer is held by the bearing disposed on the inner surface of the housing conventionally.

Furthermore, the first motor housing for housing the brushless motor may be formed by coupling a plurality of cylinders divided by the surface perpendicular to the axial direction, not limited to the configuration of the motor housing where the closing plate is mounted on the main body cylinder as described above. The arrangement of the first motor housing may be arranged in the oblique direction, the upward direction, the downward direction and similar direction corresponding to the type of the power tool and the form of the housing other than the arrangement in the forward direction where the rotation shaft extends in the front-rear direction. The first air intake opening may be removed, or the second air intake opening may be removed if the heat generation of the control circuit board is low.

Figure 13:
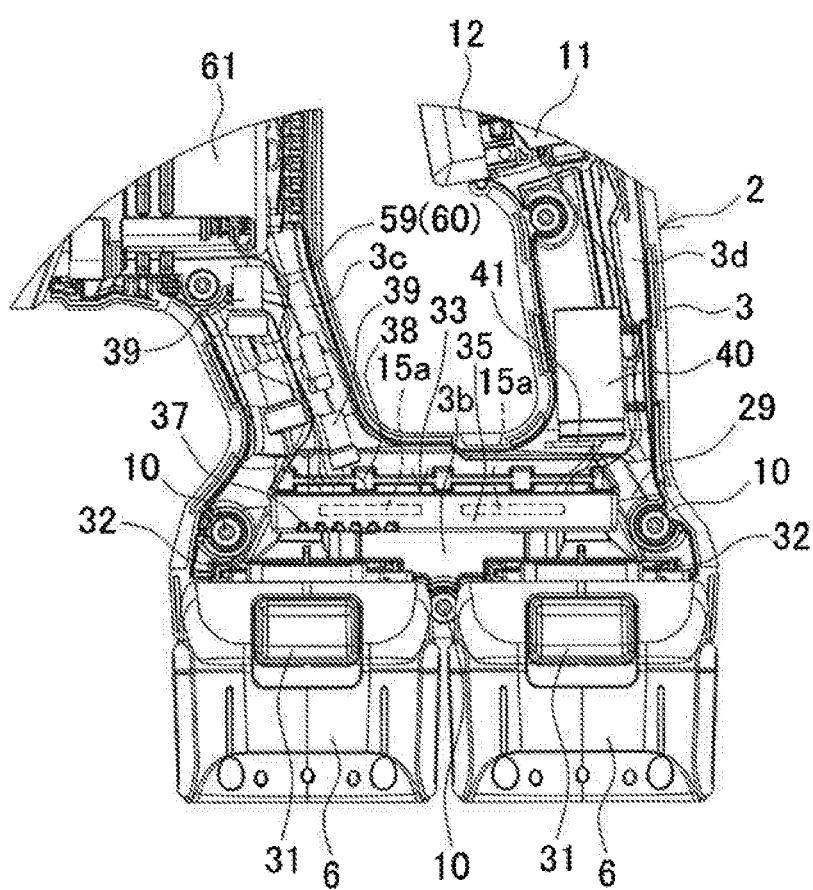
FIG. 13 is an explanatory view illustrating a modification example of a battery mounting portion.

Otherwise, as illustrated in FIG. 13 for example, the configuration where a pair of terminal blocks 32 are disposed in sideways in back and forth on the battery mounting portion 29 to mount two battery packs 6, 6 may be employed.

Then, in the embodiment where the second motor housing covers the first motor housing and the embodiment where the control unit and the battery mounting portion are disposed on the lower portion of the handle housing, these embodiments can be adopted to the power tool such as a screw driver, an electric drill, a hammer drill and similar power tool not limited to the reciprocating saw. An AC tool without the battery pack as the power source may be employed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A rechargeable reciprocating saw comprising:
   a brushless motor that includes a rotation shaft extending in a front-rear direction;
   a reciprocation converting mechanism that is driven by the rotation shaft;
   a slider that is reciprocally driven in the front-rear direction by the reciprocation converting mechanism;
   a tool holder connected to an end of the slider opposite from the reciprocation converting mechanism in the front-rear direction;
   a motor housing that houses the brushless motor;
   a handle housing that connects to the motor housing and forms a handle of the rechargeable reciprocating saw;
   a front housing that houses the reciprocation converting mechanism;
   a battery mounting portion disposed in a lower portion of the handle housing;
   a control circuit board (1) housed in the battery mounting portion and (2) that controls the brushless motor; and
   a fan on the rotation shaft that rotates with the rotation shaft; wherein:
   the battery mounting portion includes a battery mounting portion air intake opening; and
   the battery mounting portion air intake opening, the circuit board, the fan and brushless motor are located such that air suctioned through the battery mounting portion air intake opening by rotation of the fan sequentially cools the control circuit board and the brushless motor.

2. The rechargeable reciprocating saw according to claim 1, wherein:
   the handle housing includes a motor air intake opening; and the motor air intake opening, the fan, the brushless motor and the control circuit board are located such that air suctioned through the motor air intake opening cools the brushless motor without cooling the control circuit board.

3. The rechargeable reciprocating saw according to claim 1, wherein:
the handle housing is a loop type including a handle upper portion connecting to an upper side of the motor housing, a handle lower portion on which the battery mounting portion is provided, a handle front portion connecting the handle lower portion to a lower side of the motor housing, and a handle rear portion connecting the handle upper portion and the handle lower portion to serve as a grip; and
the air suctioned through the battery mounting portion air intake opening passes through the handle front portion.

4. The rechargeable reciprocating saw according to a claim 1, further comprising at least one battery mounted on the battery mounting portion.

5. The rechargeable reciprocating saw according to claim 2, wherein the battery mounting portion air intake opening, the motor air intake opening, the handle housing and the brushless motor are located such that the air from the battery mounting portion air intake opening and the air from the motor air intake opening are comingled in the handle housing before the comingled air cools the brushless motor.

6. The rechargeable reciprocating saw according to claim 5, wherein the motor housing includes a baffle plate that directs the comingled air toward exhaust ports after the comingled air cools the brushless motor.

7. The rechargeable reciprocating saw according to claim 1, wherein the motor housing and the front housing are configured such that the air cools the reciprocation converting mechanism after the air cools the brushless motor.

8. A rechargeable reciprocating saw comprising:
a brushless motor that includes a rotation shaft extending in a front-rear direction;
a fan rotated by the rotation shaft;
a reciprocation converting mechanism that is driven by the rotation shaft;
a slider that is reciprocally driven in the front-rear direction by the reciprocation converting mechanism;
a tool holder connected to an end of to the slider opposite from the reciprocation converting mechanism in the front-rear direction;
a motor housing that houses the brushless motor;
a loop type handle housing that connects to the motor housing;
a front housing that houses the reciprocation converting mechanism;
a battery mounting portion disposed in a lower portion of the handle housing; and
a control circuit board (1) housed in the battery mounting portion and (2) that controls the brushless motor; wherein:
the handle housing includes a first air intake opening;
the battery mounting portion includes a second air intake opening; and
the first air take opening, the second air intake opening, the fan, the motor housing and the handle housing are located such that air suctioned through the first air intake opening and the second air intake opening by rotation of the fan is introduced to the motor housing through the handle housing.

* * * * *